May 5, 1931.  E. W. DAVIS  1,803,601
LUBRICATING SYSTEM
Filed Aug. 1, 1925  2 Sheets-Sheet 1
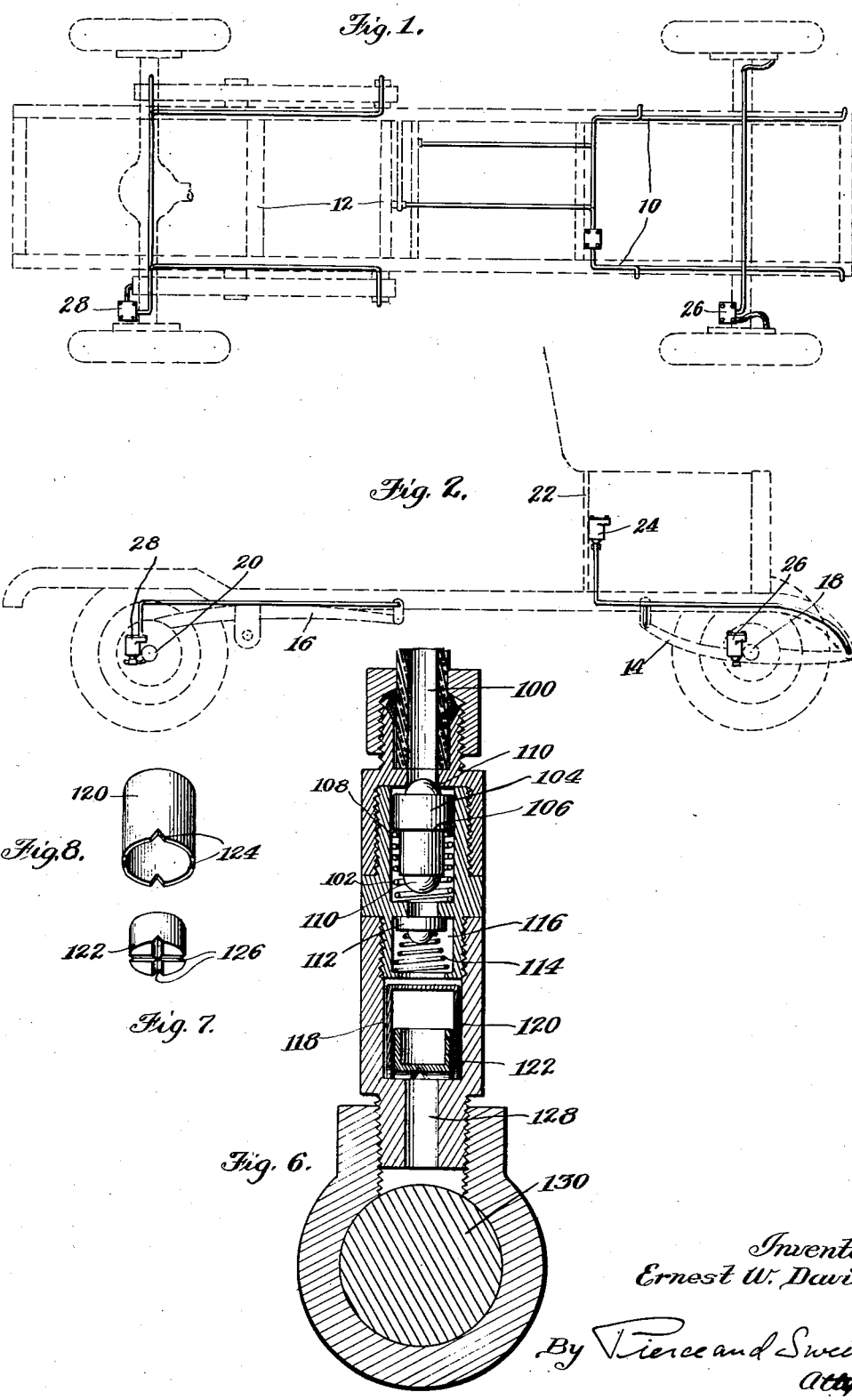

May 5, 1931.  E. W. DAVIS  1,803,601
LUBRICATING SYSTEM
Filed Aug. 1, 1925  2 Sheets-Sheet 2
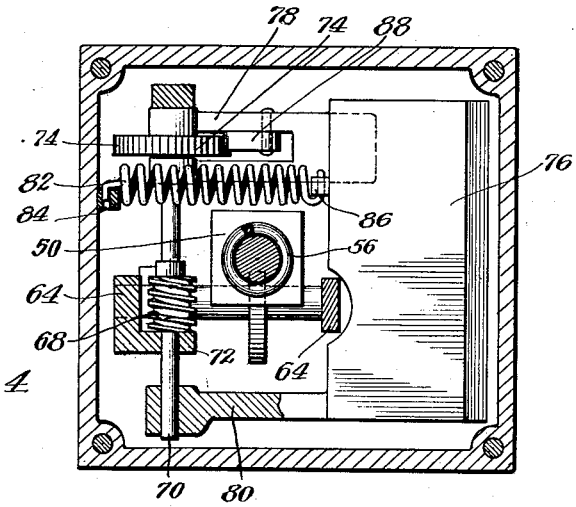
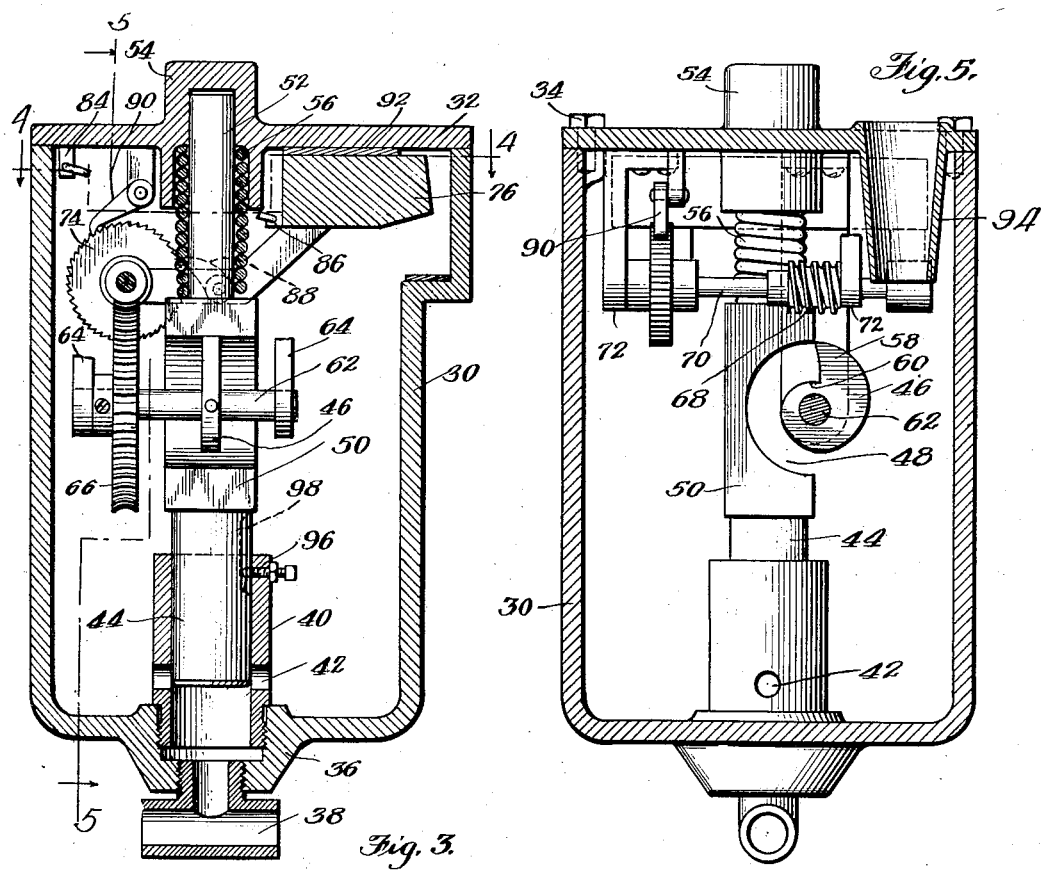
Inventor
Ernest W. Davis
By Pierce and Sweet
Attys.

Patented May 5, 1931

1,803,601

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed August 1, 1925. Serial No. 47,527.

My present invention relates to improvements in lubricating systems and is particularly concerned, though not necessarily limited, to improvements in lubricating systems for automotive vehicles.

The objects of my present invention are:

First, to provide a lubricating system embodying centralized means for supplying lubricant to a plurality of bearings;

Second, to provide a system, such as described, in which a single source of lubricant, under pressure, or a pump supplies lubricant to a plurality of bearings;

Third, to provide a lubricating system, such as described, in which the single source of lubricant, under pressure, is connected with the bearings by one or more conduits that may be branched, or divided, to supply lubricant to a plurality of bearings, so that it is not necessary to provide a conduit leading from the pump to each of the bearings;

Fourth, to provide a lubricating system, such as described, in which the source of lubricant under pressure may or may not include means for more or less accurately measuring the lubricant applied to the bearings during each operation of the system;

Fifth, to provide a system, such as described, in which means are provided at each of the bearings for apportioning the lubricant to each bearing;

Sixth, automatically to compensate for differences in the resistance of the different bearings to entry of the lubricant, and to maintain a high pressure on a bearing of high resistance and a lower pressure on one of less resistance, all independent of and without disturbance to the apportioning means;

Seventh, to provide a lubricating system comprising centralized means for placing lubricant under pressure, a conduit leading from said centralized means to one or more bearings, and means at each bearing for delivering a measured quantity of lubricant to each bearing, means preferably being interposed between the measuring means and the bearing for accumulating the measured charges of lubricant during the short interval of time required for measuring the charges and subsequently delivering the measured charges to the bearings, under more or less pressure;

Eighth, to provide a lubricating system, of the character described, embodying novel means for successively placing charges of lubricant under pressure; and Ninth, to provide a lubricating system, of the character described, that is simple in construction and economical to manufacture.

Further objects and advantages of the invention will become apparent as the description progresses.

In the accompanying drawings:

Figure 1 is a plan view indicating the application of a system according to the invention to a motor vehicle.

Figure 2 is a side elevation of the showing of Figure 1.

Figure 3 is a central, vertical section through a pump unit.

Figure 4 is a horizontal section on line 4—4 of Figure 3.

Figure 5 is a vertical section on line 5—5 of Figure 3.

Figure 6 is a section through a bearing and the connections adjacent the same;

Figures 7 and 8 are detail perspective views of the movable elements for the accumulating chamber.

In the embodiment of the invention selected for illustration a system has been shown as applied to a conventionalized motor vehicle comprising a frame made up of side members 10 and cross pieces 12 and supported by front springs 14 and rear springs 16 on the front axle 18 and rear axle 20. The dash board of the motor vehicle is indicated at 22 as a convenient support for the body pumping unit 24. A similar unit 26 is suitably mounted on the front axle and another one 28 on the rear axle.

All the bearings to be lubricated are subdivided into groups and connected to the particular pumping unit from which they can most conveniently be supplied with lubricant.

Referring, now, more specifically to the pumping unit illustrated in Figures 3, 4 and 5, the casing 30 carries a cover 32 tightly clamped in place as by bolts 34. The bottom of the casing is provided with an exit boss 36 connected to suitable piping 38 leading to the bearings to be lubricated. The pump cylinder 40 is threaded into the boss 36, and provided with laterally opening ports 42 positioned to be uncovered by the plunger 44 at the top of its stroke.

For actuating the plunger 44 I provide a cam 46 adapted to turn in an opening 48 in the side of the block 50 integral with the plunger 44. The block 50 is continued upwardly as a cylindrical extension 52, entering a guiding boss 54 in the cover, and urged downwardly by a coil spring 56. It will be apparent that slow rotation of the cam 46 will periodically lift the parts to the position shown in Figures 3 and 5 and then move the toe 58 of the cam out and let the plunger move downwardly quickly under the action of the spring 56. A suitable resilient cushion 60 is preferably provided to stop the parts at the end of the stroke.

For actuating the cam 46 I have illustrated a transmission including a shaft 62 carrying the cam and journaled in arms 64 depending from the cover 32. A worm wheel 66 on the shaft 62 is driven by a worm 68 on a transverse shaft 70 lying at a higher level and journaled in arms 72 depending from the cover. In the arrangement shown, one of the arms 72 is integral with one of the arms 64, the two defining an angle structure with one leg extending down farther than the other. The shaft 70 also carries a ratchet 74 and a weight 76 lying at the opposite side of the casing and having projecting arms 78 and 80 to pivot it on the shaft. A tension spring 82, connected between a lug 84 on the cover and a lug 86 on the weight 76, normally holds the weight in the position shown in Figure 3. A pawl 88, mounted on the arm 78, engages the teeth of the ratchet 74, which is held against retrograde movement by a ratchet 90 mounted on the cover. Suitable cushioning means 92 is preferably provided for engaging the weight 76 at both ends of its stroke.

It will be apparent that vertical oscillation of the casing 30, incident to movement of the vehicle over the road, will intermittently draw the weight 76 down from the position shown in Figure 3, and that its return will advance the ratchet 74 and slowly rotate the cam 46 step by step through small displacements.

The cover is preferably provided with a filling tube 94 extending downwardly below the cover to a point below the lowest level reached by the weight 76. This automatically prevents filling the casing to a point where the weight 76 would move in oil, which would change the inertia characteristics and interfere with the operation of the device.

It will be obvious that by changing the strength of the spring 82 or the mass of the weight 76, any desired period of oscillation may be made effective for actuating the device, and that the devices positioned on the axle should be designed and adjusted to operate on vibrations of greater frequency than those to which the body unit 24 will respond. It will also be obvious that since the path of movement of the weight is sufficient to carry the pawl 88 past a plurality of notches on the ratchet, an approximate proportionality would be maintained between the number and the severity of the jolts to which the device is subjected, and the lubricant fed.

When the vehicle is being shipped, or otherwise subjected to vibration without normal use or the need of lubricant, the plunger 44 can be locked in its uppermost position by a set screw 96, which also prevents the plunger and block from rotating, during normal use, by engaging in a slot 98 in the plunger.

Referring, now, to Figures 6, 7 and 8, each discharge stroke of the pumping unit will deliver a pressure impulse through the conduit 100. There may be more than one such conduit receiving the same pressure impulse. The lubricant from the conduit 100 passes first through a measuring chamber 102, containing a plunger 104 shouldered at 106 to receive the compression spring 108, which normally holds it in the position shown. It is provided with bosses 110 at both ends to function as valves with the inlet and outlet passages of the chamber. The clearance between the largest portion of the plunger and the walls of the chamber is very slight.

Upon receipt of a pressure impulse through the conduit 100, the plunger will move downwardly and close the exit from the chamber. In so doing it will discharge from the chamber a predetermined and substantially exact quantity of lubricant, leakage past the slight clearance being practically negligible both on account of the very small dimensions of the passage, and because the plunger itself is moving in the direction of discharge. The lubricant discharged from the measuring chamber is positively held against return movement by a check valve 112 held seated by a suitable spring 114. In the embodiment illustrated, I have housed this check valve in a separate check valve chamber 116. From the check valve chamber 116, the lubricant passes to an accumulating chamber 118. Within this chamber is an inverted cup 120, almost filling the chamber. When the unit must operate on one side or upside down I employ, also, a sealing cup 122 nested inside the cup 120. The clearance between the cups is very small, say a few thousandths of an inch. The bottom edge of the cup 120 is notched at 124 and the bottom of the cup 122 is grooved at 126 to provide an exit for oil through the final discharge passage 128 leading into the bearing 130.

It will be apparent that when the parts are assembled the space inside the cups 120 and 122 will be filled with air. Lubricant entering the chamber in substantially fixed quantity, regardless of the pressure in the chamber, because of the superior power of the injection means, will either pass through to the bearing 130 or accumulate in the chamber and compress the air in the cups, moving the cup 122 up inside the cup 120. In this way a bearing in good condition or having low resistance to the entry of lubricant will withdraw each charge simultaneously with, or very soon after, its delivery to the accumulating chamber, but a clogged bearing, or one having high resistance to the entry of lubricant, will, nevertheless, be forced to receive its full quota because the successive charges will build up a high pressure in the accumulating chamber and maintain such pressure on the bearing continuously during the intervals between charges.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:—

1. A lubricating system comprising a plurality of bearings and apportioning units connected with each of said bearings, said apportioning units each comprising a measuring chamber, an accumulating chamber and a check valve chamber located between said measuring chamber and accumulating chamber, means in said measuring chamber for forcing measured charges of lubricant through said check valve chamber into said accumulating chamber, a check valve in said check valve chamber for preventing return flow of lubricant to said measuring chamber, means in said accumulating chamber for placing the lubricant delivered thereto under yielding pressure comprising a cup-shaped member and a second cup-shaped member freely slidable in said first named cup-shaped member, said accumulating chamber being connected with a bearing to be lubricated, a pump for supplying lubricant under pressure to all of said apportioning units, and means for conducting lubricant from said pump to said apportioning units.

2. A lubricating system comprising a plurality of bearings and apportioning units connected with each of said bearings, said apportioning units each comprising a measuring chamber and an accumulating chamber, means in said measuring chamber for forcing measured charges of lubricant into said accumulating chamber, means for preventing return flow of lubricant to said measuring chamber, means in said accumulating chamber for placing the lubricant delivered thereto under yielding pressure comprising a cup-shaped member and a second cup-shaped member freely slidable in said first named cup-shaped member, said accumulating chamber being connected with a bearing to be lubricated, a pump for supplying lubricant under pressure to all of said apportioning units, and means for conducting lubricant from said pump to said apportioning units.

3. A lubricating system comprising a plurality of bearings and apportioning units connected with each of said bearings, said apportioning units each comprising a measuring chamber and an accumulating chamber, means in said measuring chamber for forcing measured charges of lubricant into said accumulating chamber, means for preventing return flow of lubricant to said measuring chamber, means in said accumulating chamber for placing the lubricant delivered thereto under pressure, said accumulating chamber being connected with a bearing to be lubricated, a pump for supplying lubricant under pressure to all of said apportioning units, and means for conducting lubricant from said pump to said apportioning units.

4. A lubricating system comprising a plurality of bearings, means at each bearing for measuring and accumulating, under yielding pressure, successive charges of lubricant and for subsequently delivering the measured charges of lubricant to each bearing comprising a measuring means, an accumulating means for receiving measured charges from said measuring means, means for preventing return flow of lubricant from said accumulating means to said measuring means, a pump, and means for conducting lubricant from said pump to each of said measuring and accumulating means.

5. A lubricating system comprising a plurality of bearings, means at each bearing for measuring and accumulating successive charges of lubricant and for subsequently delivering the measured charges of lubricant to each bearing comprising a measuring means, an accumulating means for receiving measured charges from said measuring means, a pump, and means for conducting lubricant from said pump to each of said measuring and accumulating means.

6. A lubricating system comprising a plurality of bearings, means at each of said bearings for measuring and storing, under yielding pressure, succesive charges of lubricant, a pump, means for connecting said pump with said measuring and storing means, and means for preventing the maximum pressure exerted on said measuring means from being communicated to said storing means.

7. A lubricating system comprising a bearing, means for producing successive charges of lubricant, yielding means for receiving the charges of lubricant from said charge producing means and for supplying the lubricant to said bearing under pressure, means to cut off the supply of lubricant to said yielding means upon a charge of predetermined quantity, and a pump for supplying lubricant under pressure to said charge producing means.

8. A lubricating system comprising a bearing, means at said bearing for successively measuring charges of lubricant, means for storing more than one, succesive charge of lubricant, means for conducting the measured charges of lubricant to said bearing, and a pump for delivering lubricant under presure to said first named means.

9. A lubricating system comprising a plurality of means, one adjacent each bearing to be lubricated, said means acting periodically to deliver measured charges of lubricant under pressure, check valved means receiving said lubricant, a resilient pneumatic storage chamber in constant communication with said check valved means, and a bearing always in free communication with said chamber and adapted to receive lubricant therefrom.

10. A control unit for lubricant supply systems comprising a housing having an inlet and an open outlet, a check valve in said inlet, a cup adapted to contain air reciprocable within and in open communication with said housing between said check valve and said outlet, and means for separating said air from said conduits.

11. In combination with a bearing to be lubricated, a conduit leading to said bearing, a check valve in said conduit, said conduit being continuously open from said check valve to said bearing, an air filled chamber in open communication with said conduit between said check valve and said bearing, and a separator for keeping the air in place in said chamber, said check valve, air chamber, and separator being axially aligned within said conduit.

12. A lubricating system comprising means acting periodically to deliver charges of lubricant under pressure, check valved means receiving said lubricant, a resilient pneumatic storage chamber communicating with and supplied with lubricant from said check valved means and movable relative thereto, and a bearing communicating with said chamber to receive lubricant therefrom.

13. A lubricating system comprising means acting periodically to deliver lubricant under pressure, check valved means receiving said lubricant, a resilient storage chamber communicating with and supplied with lubricant from said check valved means and movable relative thereto, and a bearing communicating with said chamber to receive lubricant therefrom.

In witness whereof, I hereunto subscribe my name this 14th day of July, 1925.

ERNEST W. DAVIS.